Oct. 7, 1941.　　　　F. LAGO　　　　2,258,415
REFRIGERATING APPARATUS
Filed March 11, 1938　　　4 Sheets-Sheet 1

INVENTOR.
Francis Lago
BY
ATTORNEYS.

Oct. 7, 1941.   F. LAGO   2,258,415
REFRIGERATING APPARATUS
Filed March 11, 1938   4 Sheets-Sheet 2

INVENTOR.
BY Francis Lago
ATTORNEYS.

Oct. 7, 1941.  F. LAGO  2,258,415
REFRIGERATING APPARATUS
Filed March 11, 1938   4 Sheets-Sheet 3

INVENTOR.
Francis Lago
BY Willis B Rice
ATTORNEYS.

Oct. 7, 1941.   F. LAGO   2,258,415
REFRIGERATING APPARATUS
Filed March 11, 1938   4 Sheets—Sheet 4

INVENTOR.
BY Francis Lago
ATTORNEYS.

Patented Oct. 7, 1941

2,258,415

UNITED STATES PATENT OFFICE 2,258,415

REFRIGERATING APPARATUS

Francis Lago, New York, N. Y.

Application March 11, 1938, Serial No. 195,234

40 Claims. (Cl. 230—85)

This invention relates to a new and improved apparatus for compressing fluids under pressure, particularly for operating refrigerating apparatus in which compression is employed, without bearings or bearing surfaces, by the use of oscillations electrically created in a conductive fluid.

An object of this invention is to generate and control the oscillations in such a manner that they may be used effectively and reliably to create and maintain the pressures desired and so that the apparatus may function for prolonged periods of time without undue attention and substantially without noise.

A further object is to provide a new and reliable mechanism for maintaining the supply of conducting liquid without loss.

A further object is to provide a new and improved system for controlling the electrical energy by movement of the conducting liquid so that the oscillations are maintained reliably at the desired rate.

A further object is to provide a new and improved system for maintaining the distribution of the electrical current through the conducting liquid whereby the maximum effect may be maintained.

A further object is to provide a new and improved chamber for a conducting liquid which permits the passage of the electrical current transversely through the liquid with efficiency and without obstructing the movement of the liquid in the chamber.

A further object is to provide a new and improved apparatus for maintaining an alternating magnetic field about such a conducting liquid in fixed phase relation to the current through the liquid.

An apparatus of this character requires a magnetic field which may be created by a suitable winding energized from any standard power main, but it also requires a current through the conducting liquid of large magnitude which in practice makes it desirable to utilize a secondary current of a transformer.

It is one of the objects of this invention to provide means for creating such a magnetic field and such secondary current in fixed phase relation to each other.

It is a further object of this invention to provide a means for reciprocating a liquid which will absorb the energy of the conducting liquid before it is brought to rest and utilize that energy to initiate the movement of the liquid in opposite direction without destroying the volumetric efficiency of the device and more particularly to confine a volume of gas in such a manner that it is compressed after the power stroke of the liquid has been completed and the gas so compressed is used to start the reversal of the liquid before the intake stroke commences without permitting the mingling of the said compressed gases with the intake gases. In this manner there is less likelihood of that portion of the liquid which is under direct influence of the electric current moving more rapidly than the remainder so as to break the column of liquid.

The invention accordingly comprises the features of construction, combination of elements and arrangements of parts, which will be exemplified in the construction hereinafter set forth and the scope of the application of which will be indicated in the claims.

For a fuller understanding of the nature and objects of the invention, reference should be had to the following detailed description, taken in connection with the accompanying drawings, in which.

The apparatus comprises primarily a U shaped conduit 10 adapted to contain a conducting liquid having its legs 11 and 11a carried in slots 12 and 12a of magnetic cores 13 and 13a energized by electric coils 14 and 14a.

The apparatus connected with one leg is the same as the one connected with the other, so that only one need be described.

Figure 1:
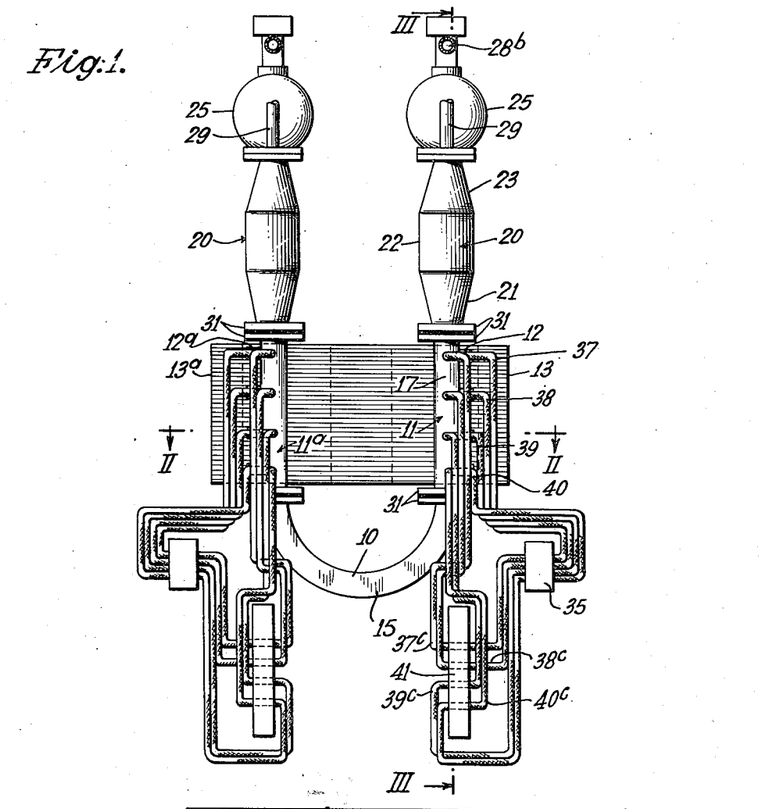
Figure 1 is a front elevation of an apparatus embodying this invention, the primary circuits being removed.

In the form illustrated in Figure 1, the bottom portion 15 of U shaped conduit may be made of any suitable material inert to the conducting liquid which will preferably be mercury, but the legs 11 comprise side walls 16 of insulating members held together in spaced relation by conducting end walls 17 to provide a rectangular shaped bore 18 communicating with the bottom 15 of the U. I prefer to use for the insulating members a thin metallic sheet coated with an insulating coating in order to get a proper strength with sufficient thinness.

Above the leg 11 is a compressing chamber 20. This compressing chamber is tapered in a form gradually to expand its area of cross section from the end of the leg 11 upwardly in order to absorb the momentum of the rapidly moving mercury in the conduit and above this tapered portion is a body portion of area sufficiently substantial so that the chamber will contain the body of gas to be compressed and above the body portion is a gradually contracting portion to retard the flow of liquid as it approaches the end of its movement and to direct any unabsorbed force against the ball valve to be described.

As shown, the compressing chamber has a lower conical portion 21 having its apex downwardly, a central cylindrical portion 22 and an upper conical portion 23. At the upper end of the compressing chamber there is provided a cushioning chamber 25 carrying a valve mechanism for admitting gas to the compressing chamber and a valve mechanism for permitting the exit of such gas.

Figure 3:
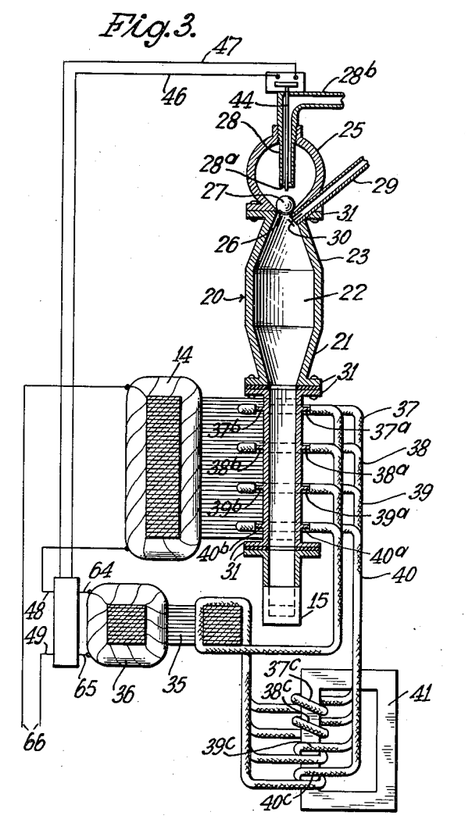
Figure 3 is a vertical section on the line 3—3 of Figure 1.
Figure 4:
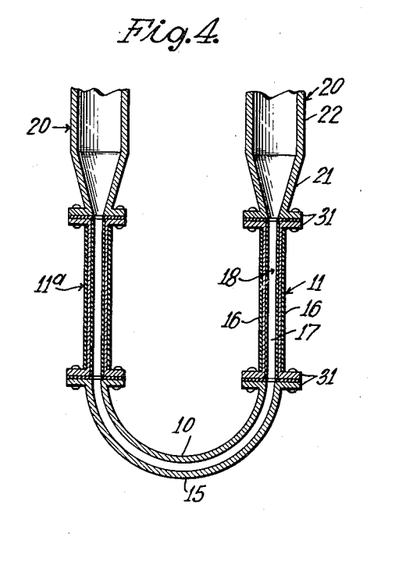
Figure 4 is a vertical section on the line 4—4 of Figure 2, parts being omitted.

In the form shown in the first embodiment, as particularly detailed in Figure 3, the cushioning chamber 25 has a valve seat 26 adapted to be closed by a ball 27, as for example a steel ball, which serves as an outlet for the compressed gas and permits the escape into the cushioning chamber of any excess mercury.

A hollow stud 28 extends downwardly within the cushioning chamber 25 and carries at its lower end a port 28a with which the valve 27 comes in contact when it is floated upwardly by the mercury. This hollow stud 28 comprises the entrance to the discharge pipe 28b. As soon as the ball 27 comes in contact with the port 28a it shuts off discharge through the discharge conduit 28b. Thereupon the conducting liquid rises in the cushioning chamber 25 compressing the gas within that chamber and by this pressure gradually bringing the liquid column to rest. Meantime by mechanism which will be later described, the electric current has been reversed and the pressure on the mercury relieved and as soon as the pressure on the mercury in the compression chamber is sufficiently relieved, the pressure of the gas within the cushioning chamber 25 forces the conducting liquid out of the cushioning chamber back into the compression chamber. When the level of the liquid has passed below the valve seat 26, the valve 27 closes against the valve seat 26 so that any further drop in the conducting liquid creates the suction within the compression chamber. A gas inlet is provided at 29 having a check valve 30 to permit the free inlet of gas from the gas inlet but to prevent the exit thereof.

In practical construction the cushioning chamber 25, the compressing chamber 20, the leg 11 and the bottom 15 of the U are each provided with flanges 31 at their meeting edges so that they may be tightly clamped together. I prefer to line the chambers with an insulating coating and provide proper insulation between the various parts.

Means are provided for passing a substantial current between the conducting walls 17 of the leg 11 through the liquid, as for example, mercury, contained in the tube. This means comprises a transformer 35 having a primary 36 in series with the magnetizing coil 14, and having secondaries connected to the conducting end walls.

With such a current flowing, however, there is a tendency because of the induced electromotive force generated by the magnetic flux through the conducting liquid for a greater amount of current to flow across the conducting liquid at one point than another.

Figure 11:
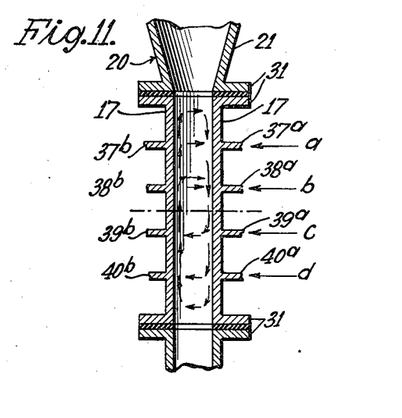
Figure 11 is a diagrammatic view showing the effect induced currents within the column of conducting liquid.

The reason for this will be readily apparent by examining Figure 11 showing diagrammatically the current distribution in the conducting liquid. In this figure the current from the transformer secondary is flowing from right to left and the magnetic flux is moving perpendicular to the paper. The sheet of conducting liquid, therefore, between the conducting end walls thus serves as a short circuited secondary in the path of the magnetic flux and thereby has currents induced in it in a general circular direction parallel to the plane of the paper, that is, for example this induced current moves downwardly on the right through the conducting fluid, then across to the left at the bottom and upwardly at the left and back. This induced current, therefore, will oppose the current flowing from the transformer secondary at the upper portion of the conducting wall and will assist the current flowing from the transformer at the lower portion of the conducting wall.

Figure 2:
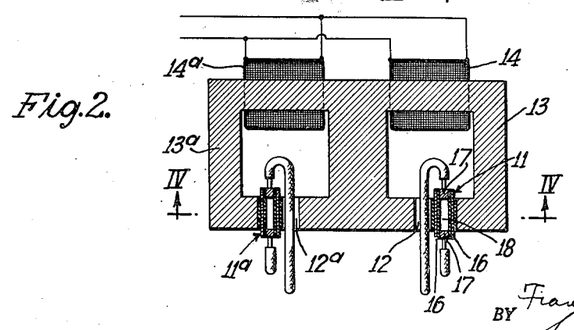
Figure 2 is a horizontal section on the line 2—2 of Figure 1.

In the apparatus of Figures 1–3 each of the end walls 17 is divided into a plurality of zones, each having a separate terminal or electrode. For example on the front wall 17 there are provided terminals 37a, 38a, 39a, and 40a and on the corresponding rear wall there are provided terminals 37b, 38b, 39b and 40b. The transformer 35 is provided with a plurality of secondaries in multiple designated as 37, 38, 39 and 40, each of which is connected across the terminals bearing the like member.

To equalize the current in the different secondaries notwithstanding the distributing effect of the induced current in the conducting liquid there is provided in the construction shown in Figures 1–3 an equalizing transformer 41 having a plurality of coils 37c, 38c, 39c and 40c, each connected into the corresponding secondary circuit, but the coils 37c and 38c are connected into their secondaries in a direction reverse to the coils 39c and 40c so that an excess of current flowing in the upper two secondaries will be opposed by the reactance of the transformer 41 which will in turn serve momentarily as a primary to add additional voltage to the two secondaries thus reducing the greater current and increasing the lesser.

Figure 12:
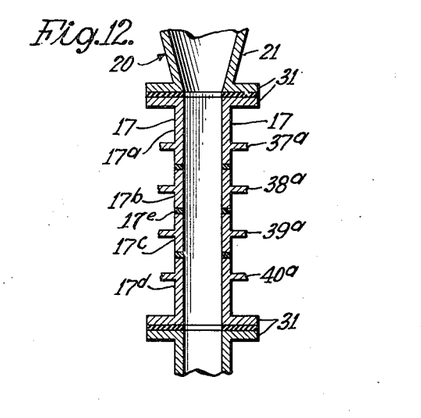
Figure 12 is an alternative form of electrode.

Since the voltages at the terminals 37a, 38a, 39a and 40a are different, a current will flow along the electrode diminishing the effect of the equalizing transformer 41. It is therefore desirable to reduce this current as far as possible, which may be accomplished either by making the conductor of material of high resistance, such as nichrome, or it may be accomplished by the construction shown in Figure 12, in which the entire conducting member 17 is separated into sections 17a, 17b, 17c and 17d insulated from each other by insulating material as shown at 17e, so that each of the terminals 37a, 38a, 39a and 40a is separated from its neighbor except insofar as it is in contact with the conducting liquid.

The liquid level is normally about the middle of the compressing chambers and the amount of movement is such as alternately to fill and empty those chambers.

In the form of the invention disclosed in Figures 1-3, the current from the back end wall 17 is carried forward to the front wall of the device to return to the transformer. To accomplish this result there is provided for each secondary circuit, a slot in the face of the iron core closely adjacent to the terminals of that secondary and the return conductor of that secondary is carried forward through this slot. By this arrangement it will be seen that the outgoing current through the conducting liquid and the return current through the conductor in the slot are doubled back upon themselves as closely as the physical materials permit. This reduces to a minimum the internal reactance of the circuit, permitting the accurate maintenance of the phase relationship between the current through the conducting liquid and the magnetic flux. Moreover, by reason of the fact that the return conductor is in the same horizontal plane as the current through the liquid and the flux runs parallel to that plane, there is no interlinkage between the secondary circuits and the magnetic flux and thus the current in the secondary is not disturbed by voltage induced in the secondary by that flux.

It is the purpose of this apparatus to move the liquid alternately, first into one leg of the U tube and then into the other. To accomplish this purpose, the relationship of the polarity of the magnetic field to that of the current through the liquid in the one leg will be opposite to that in the other, so that as the liquid is forced downwardly in the one leg it will be forced upwardly in the other and means are provided for reversing these phase relationships in both legs at the same time at the completion of the moving of the liquid from either side to the other.

Figure 5:
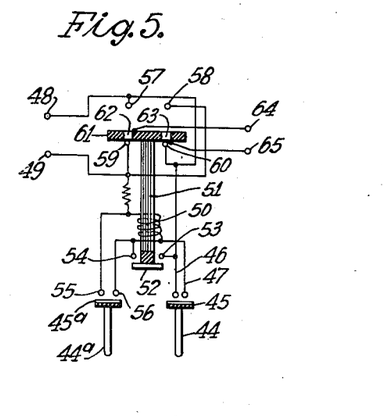
Figure 5 is a wiring diagram of the reversing means.

Reversing mechanism is shown in the type of Figure 3 and in Figure 5.

As will be seen there is provided in the cushioning chamber 25 centrally disposed in the stud 26 a contact rod 44 carrying at its upper end a conductor 45 adapted when the rod is raised to make contact between terminals 46 and 47. This rod 44 is in position to be moved by the ball 27 when it is floated upwardly. The terminal 46 is connected with a terminal 48 and the terminal 47 is connected with the terminal 49 through a solenoid 50, the terminals 48 and 49 being energized as will be hereinafter described. The core 51 of the solenoid 50 moves a conducting bar 52 to make contact between terminals 53 and 54. The terminal 53 is connected with the terminal 48 and the terminal 54 is connected to the terminal 47 so that when once the core of the solenoid is raised, circuit through the solenoid 50 is held closed by the conductor 52 even though contact rod 44 should drop.

The conductor 45a on contact rod 44a on the other leg of the U, bridges terminals 55 and 56 to short circuit the coil 50 thereby causing the solenoid core 51 to drop and, as soon as it has dropped far enough to break contacts between the terminals 53 and 54, it will stay down notwithstanding the fact that the conductor 44a has also dropped. Thus, on raising and lowering the rod 44 at one extreme of the motion of the liquid the core 51 is raised and will remain in raised position until the rod 44a is raised at the other extreme of the motion of the liquid, whereupon the core drops and stays dropped until the rod 44 is again raised.

The rods 44 and 44a are in position to be contacted by the ball 27 or the like ball on the other side when the ball is pushed upwardly by the conducting liquid and apparatus operated by solenoid 50 is provided for reversing the phase of the magnetic field relative to the current in the conducting liquid.

As illustrated there are provided four contacts 57—58—59 and 60. Contacts 57 and 58 being connected respectively to terminals 48 and 49 and contacts 59 and 60 being connected respectively to terminals 49 and 48. The core 51 carries insulated bar 61 having conducting blocks 62 and 63 exposed on both sides thereof in position to engage the contacts 57 and 58 when the core of the armature is raised, and normally engaging the contacts 59 and 60 when the armature is dropped. Conducting leads are carried from the conducting blocks 62 and 63 to terminals 64 and 65.

As will be seen from Figure 3, the terminals 49 and 48 are connected respectively to one side of the power line at 66 and to the magnetizing coil 14 and the terminals 64 and 65 are connected to the primary of transformer 36. Thus at all times the magnetizing coil is in series with the primary 36 of the transformer but the polarity of the two coils relative to each other is reversed every time the core 51 changes its position.

With this construction it will be evident that when the power is put on the line by a switch not shown, the current through the conducting liquid from the transformer secondaries acting on the magnetic field forces the liquid upwardly on one side of the tube until it strikes the ball 27. During the first part of this motion while the liquid is filling the bottom conical part 21 of the compressing chamber, the conical shape dissipates the momentum of the liquid and keeps it with a comparatively level upper surface preventing the tendency that would otherwise exist to form a spout shooting up above the general level of the liquid. This is an important feature since if such a spout is permitted it has the tendency to strike the reversing mechanism of to close the exhaust valve before the full stroke of the liquid has been completed, thus impairing the operation of the device.

When the lower conical portion of the compressing chamber has been filled, the liquid continues to rise in the cylindrical part of the chamber. At this time, however, the quantity of liquid above the bottom of the chamber is so great that there is no objectionable tendency to form a spout. For this reason the chamber at this part of its length can be made cylindrical.

In theory the form of the chamber should be curved from top to bottom but in practice the exact shape does not seem to be of great importance so long as the functions here described are performed and we have found that the shape here described serves well.

If the enlarged diameter of the cylindrical portion of the tube were to continue to the top it would result in a sudden blow on the top of the compressing chamber at the end of the stroke of the liquid and difficulty would be experienced in cushioning this blow. With the form of chamber here described, liquid as it reaches the end of its stroke is caused to rise in the section 23 with a gradually reduced diameter, so that the full force of the momentum is directed against the ball 27 and not against the top of the tube. When the ball 27 is raised the liquid is all directed into the cushioning chamber to have its force stored and returned.

During the rise of the liquid in the compressing chamber, the ball 27 permits the gas compressed in the chamber to exit through the exhaust conduit 28b, but the movement of the ball is not enough to operate the rod 44a. As soon, however, as the force of the moving liquid strikes the ball it is thrown upwardly and closes the exhaust by fitting tightly against valve seat 28a.

After that the momentum of the moving liquid compresses the gases within the chamber 25, which at this time has no outlet. This compression absorbs all of the remaining momentum of the liquid and the pressure of the compressed gases within this cushioning chamber exerts a strong force to start the momentum of the liquid in the reverse direction. The ball 27 remains closed against valve seat 28a until the level of the liquid is substantially at the bottom of the cushioning chamber at which time the pressure within the chamber is substantially the same as the pressure within the discharge conduit. Immediately after that the ball 27 fits against valve seat 26 closing the cushioning chamber and the discharge conduit.

Meanwhile the rod 44 has reversed the polarity of the current through the liquid and the electrical force is acting with the pressure in the cushioning chamber to bring the liquid up to speed in the opposite direction. The pressure in the cushioning chamber and the time of reversing the current should be so adjusted that the lower part of the liquid under the influence of the electric current will not be moved faster than the upper parts which are under the influence of the gas pressure.

As soon as the liquid in the chamber falls below the intake valve 30, the latter opens and the chamber fills with fresh gas and the stroke continues until the liquid rises in the other chamber 23a to operate the rod 44a.

Figure 6:
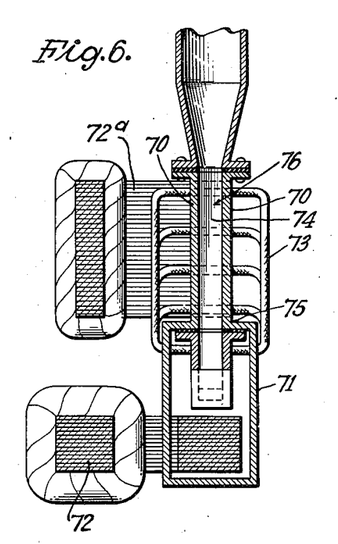
Figure 6 is a vertical section to a modified form of apparatus.

In the form of the invention disclosed in Figure 6, the circuits in the tube show a different means for feeding the secondary currents to the conducting liquid. In this form the conducting end walls 70 of the conduit corresponding to the end walls of the former movement are directly connected at their bottom to the conductor 71 which itself encloses the core of the transformer 72 and serves as a secondary.

To compensate for the magneto-motive force of the coil 71 acting upon the core 72 windings 73 are disposed in slots in the field pieces adjacent to the leg 74 of the U tube and a current is so circulated in the windings 73 as to be opposite to the current passing across between the conducting elements 70. It is to be noted that windings 73 are so disposed as also to compensate for the magnetic eccentricity of the conducting elements 70. This eccentricity being due to the fact that the lower portion of the tube, as shown at 75, carries the total current while the upper portion, as shown at 76, carries a much smaller portion.

Figure 7:
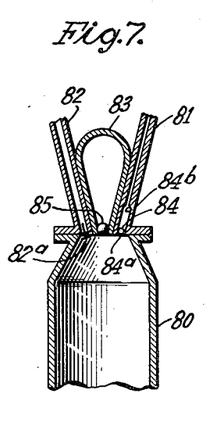
Figures 7 and 8 are vertical sections of a modification of the cushioning and discharge means.

In the modification illustrated in Figure 7, the compressing chamber 80 corresponding to the compressing chamber 20 of the first modification has a gas outlet 81 and a gas inlet 82 and a cushioning chamber 83, but the ball valve 84 of the outlet conduit 81 is arranged to close off the outlet conduit as soon as the conducting liquid strikes the valve and the cushioning chamber 83 is a separate element comprising a closed chamber containing a compressible gas and controlled by a valve 85. In this modification when the conducting liquid rises to the top of the chamber 80, it strikes the valve 84 and closes the outlet conduit. The remainder of the energy of the mercury is stored by permitting it to enter the cushioning chamber 83 compressing the gas therein. As soon as the liquid has been brought to rest, the force of the compressed gas assists gravity and the electric current to start the reverse half of the cycle until the ball valve 85 which is floating upon the conducting liquid returns to its seat, whereupon the exit of mercury from the cushioning chamber ceases and the outflow of gas from said chamber is prevented and the suction created by the fall of the mercury draws fresh gas in at the inlet port 82.

As will be noted from the drawings, the check valve 84 moves in a vertically elongated recess provided with a valve seat 84a at the bottom and a valve seat 84b at its top. During normal discharge of compressed gas the valve assumes a middle position but when the liquid rises into the cushioning chamber it floats the valve 84 against the upper U seat 84b, thus closing the discharge port and the liquid can move further only by compressing the gas within the cushioning chamber. The pressure thus generated helps to start the liquid in the reverse direction as in the previous modification but before any of the gas within the cushioning chamber enters into the compression chamber the two chambers are separated by the closing of the valve 85.

In this form of the invention it will be understood that any means for operating the reversing mechanism may be employed, as for example the pin 44 may be operated by any of the valves 84 or 85 or by inlet valve 82a.

Thus in either of these forms of the device, the pressure of the gas in the cushioning chamber is used to stop the movement of the liquid column and start its movement in the reverse direction until it has fallen low enough to open the intake valve, whereupon the gas within the compression chamber is sealed in by the valve and the full force of the moving column is used to draw in fresh gas to be compressed. This cutting off of the cushioning chamber is important in securing practical efficiency for the device.

Figure 8:
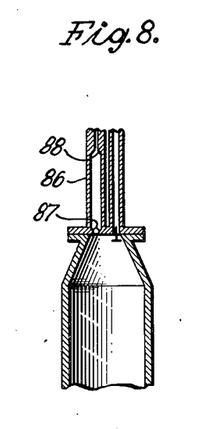

The form of the cushioning chamber illustrated in Figure 8 is suitable for use where the momentum of the moving column of liquid is sufficiently low. In this case the outlet 86 is arranged to prevent the passage of mercury into the outlet manifold by floating the ball valve 87, as previously described, up against an upper valve seat 88, but the cushioning chamber may be dispensed with.

Figure 9:
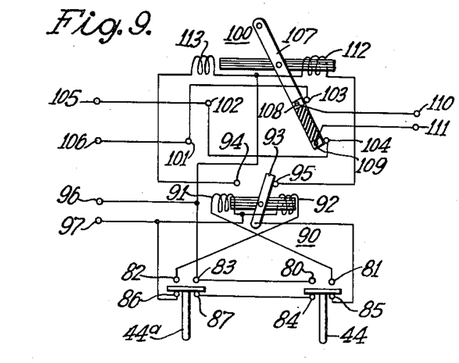
Figure 9 is a wiring diagram of a modified form of reversing means.

In Figure 9 there is shown an alternative form of reversing mechanism in which the conductors 45 and 45a on rods 44 and 44a are arranged to make contact respectively between terminals 80, 81 and 82, 83 in their upper positions and between terminals 84, 85 and 86, 87 in their lower positions.

The numeral 90 represents generally a relay having opposed coils 91 and 92 and a contact arm 93 adapted to make contact either with a terminal 94 when actuated by the coil 91 or with a terminal 95 when actuated by the coil 92. These coils 91 and 92 are arranged to be actuated by the raising of the rod 44 or 44a respectively. As shown, contacts 80 and 83 are connected to one terminal 96 of the power circuit and terminals 81 and 82 are connected to the coils 91 and 92. The other sides of these coils being connected to the other power terminal 97 to which the other terminal 86 is also connected, terminals 84 and 87 being connected together.

The numeral 100 represents generally a two pole double throw relay having its contacts 102 and 104 cross connected and connected to terminal 105 and its other two contacts 101 and 103 cross connected and connected to terminal 106. The insulated relay arm 107 has two conducting elements 108 and 109 connected to terminals 110 and 111 and is so disposed on the arm, that as the arm is moved to the right as seen in Figure 9, terminals 105 and 106 will be connected to terminals 111 and 110 respectively, but when the arm is moved to the left the polarity will be reversed.

The terminals 105 and 106 and 110 and 111 of this modification correspond to the terminals 48 and 49 and 64 and 65 of the constructions shown in Figure 3. The polarity being so chosen as to cause the liquid to move in the desired direction.

Coil 112 of the relay 100 is connected to terminal 95 and coil 113 to terminal 94, the other side of both being connected to the terminal 96.

With this means of reversing, the reversed current is not applied until after gravity and the cushioning chamber have already reversed the mercury column. This feature has marked advantages in the saving of power in that the momentum is stored and used instead of being destroyed and it avoids the heavy current that would flow if the mercury continued to flow in the same direction after the power had been reversed.

During the cycle with the mercury moving, the current circulating from electrode to electrode is limited by the resistance of the circuit and the counter-E. M. F. which acts opposite in direction to the applied E. M. F. If the field flux or the mercury current is reversed while the mercury travels in the same direction due to momentum, the applied E. M. F. and the counter-E. M. F. will act in the same direction and the mercury current will then be much greater than normal and the energy will be dissipated overcoming the inertia of the mercury and in I²R losses. If the reversed current were to be reapplied only after the mercury began moving on the return stroke, the heavy current transient would be eliminated. The saving of power would be credited to the reversing means and to the cushioning chamber which has stored energy to release in starting the mercury on the reverse stroke.

Figure 10:
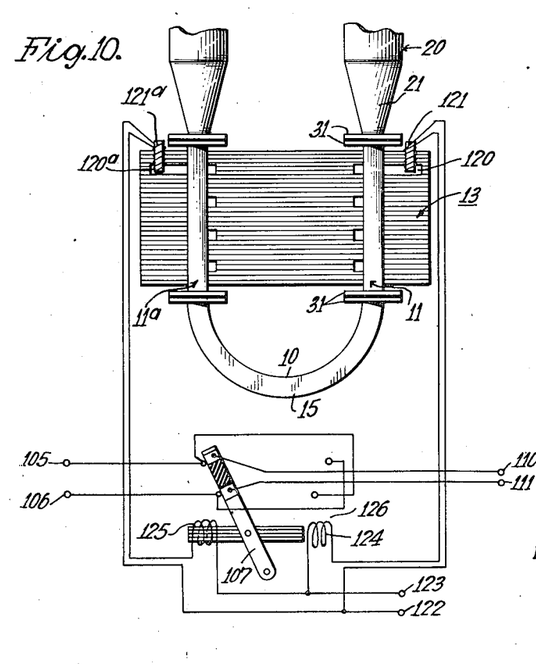
Figure 10 is a wiring diagram of a further modification of the reversing means.

In the form of the invention disclosed in Figure 10, a different means is provided for reversing the relative phase of the liquid current in the magnetic flux. In this figure the numeral 120 designates a slot in the magnetic core 13 to accommodate a coil 121 in position closely adjacent to the conduit. This coil is placed across the line terminals as shown at 122 and 123 in series with a coil 124 of a relay 126. A similar coil 121a being situated on the other leg of the U in series with the other coil 125 of the relay 126. The relay has an arm 107 in all respects similar to the arm 107 of the construction shown in Figure 9, and it is arranged to reverse the current in the same way.

With this construction the coils 121 and 124 are opposed to each other so that neither can operate the relay arm 107 until their circuits are unbalanced by coils 121 or 120a. If, however, mercury be present in that portion of tube 11 opposite coil 121 and no mercury be present in that portion of tube 11a opposite coil 120a, coil 121 will drop in impedance because it will have in effect a short circuited secondary. This will increase the pull on relay coil 124 which now overbalances coil 125 and operates arm 107. Thus the circuit is reversed whenever the level of the mercury falls below coil 121 or 12a.

Ordinarily the level of the conducting liquid will be sufficient to short circuit coils 121 and 121a at the same time, but as these coils thus tend to balance each other, the arm 107 will not be moved but will remain in whatever position it happens to be.

Coils 121, 121a, 124 and 125 are always energized from terminals 122 and 123. Since their impedances are nearly equal (excepting only the effect of the solenoid core on 124 and 125 which may be designed to be small) the currents in the two parallel circuits are equal and the relay is not actuated but remains in whatever position it happens to be. As soon as the mercury level is below say 121a, this coil is no longer the primary of a small transformer but is now a choke coil. Its impedance increases and consequently the current decreases in the series circuit of coils 121a and 125. Since the current in the series circuit of 121 and 124 is not changed, coil 124 is now more powerful than 125 and the arm 107 is pulled to the right effecting reversal. The mercury now moves up past 121a and both 125 and 124 are equally energized so that the pull of one is counterbalanced by the equal pull of the other and arm 107 remains in its position. As the mercury keeps rising up the left leg of the conduit, its level keeps dropping down the right leg until it passes coil 121. By the same reasoning as above, coil 125 now exerts a greater pull than 124 and the arm 107 swings to the left, again effecting reversal.

Figure 14:
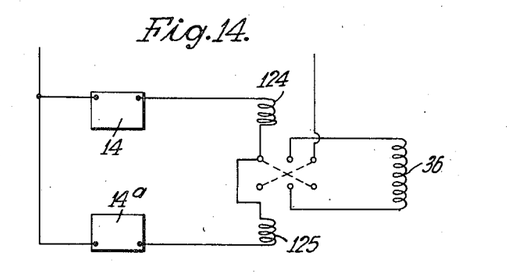

When the amount of conducting liquid is kept low enough in the system so that during the movement the level falls below the magnetic field the coil 14 or 14a on the side where the liquid has fallen will have a materially higher reactance than the other coil which is in fact short circuited by the conducting liquid. This difference in reactance may be utilized to operate the reversing mechanism by the construction shown in Figure 14, in which it will be seen coils 14 and 14a are placed in multiple, each in series with one of the coils 124—125 and this multiple circuit is in series with the transformer primary through the reversing mechanism. By this construction decreased reactance of either field coil will cause an increased flow of current through the relay coil to throw the relay.

Figure 13:
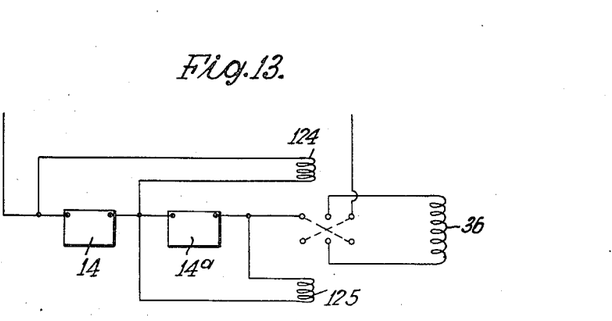
Figures 13 and 14 are wiring diagrams.

This system also may be used in accordance with the construction shown in Figure 13, in which the two field coils are placed in series with each other and with the transformer primary through its reversing mechanism, but one of the relay operating coils is placed in multiple with each of the magnetizing coils.

With this construction whenever the reactance of one of these coils decreases the current through the relay coil correspondingly decreases and the other coil which is still functioning at its full value is able to throw the relay. The operation of the relay by the relay coils is the same as has been previously described.

By any of these constructions it will be seen that the liquid is pulsated up and down throughout the height of the compressing chamber as current is applied to the device and thus a constant supply of compressed air is furnished which may be used for any purpose, as for example for refrigeration.

It will be seen, moreover, that this result is accomplished without any reciprocating pistons or rotary shafts.

Since certain changes may be made in the above construction and different embodiments of the invention could be made without department from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A device of the character described comprising in combination a U-shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said reversing means comprising an element actuated by the momentum of the conducting liquid as it reaches the end of its movement in the conduit.

2. A device of the character described comprising in combination a U-shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, a coil adjacent to a portion of said conduit in position to be traversed by the magnetic flux passing through said portion and connected to actuate said reversing means, said device being so constructed and arranged that the reversing means is actuated by the absence of the conducting liquid in one portion of the conduit.

3. A device of the character described comprising in combination a U-shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, there being a cushioning chamber for each leg of the tube connected to the top thereof by a port controlled by a valve adapted to float above said port on the conducting liquid, whereby liquid may pass into and out of the said cushioning chamber without closing said valve, but said valve will reseat itself on said port to prevent the entrance of gas into said tube from said cushioning chamber.

4. A device of the character described comprising in combination a U-shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, a buoyant member at the upper end of each leg of the tube, said reversing means being actuated by the buoyant member.

5. A device of the character described comprising in combination a U-shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, a cushioning chamber to each leg of the tube connected to the top by a port controlled by a valve adapted to float above said port on the conducting liquid, said reversing means being so situated as to be actuated by the movement of said valve.

6. A device of the character described comprising in combination a U-shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, a cushioning chamber provided on each leg of the tube to receive excess conducting liquid after the discharge of compressed gas through said outlet has ceased, and means to close said cushioning chamber on the reverse stroke after the said excess conducting liquid is drained from the chamber.

7. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said magnetic field and electric circuit comprising a magnetic field and electric circuit in each leg of the conduit, the gas outlet being provided with a buoyant valve adapted to seat against either an upper or lower valve seat whereby the buoyant valve is closed against the exit of gas only after all the liquid has passed said lower seat and the said valve is closed against the lower seat as soon as the liquid level falls to the level of the lower seat.

8. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said magnetic field and electric circuit comprising a magnetic field and electric circuit in each leg of the conduit, the reversing mechanism being arranged to open the electric circuit causing the movement of said conducting liquid before the completion of the movement of said liquid and to close said circuit for reverse movement after the reversing movement has begun.

9. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, a discharge manifold connected to said gas outlet, and means to prevent the discharge of said conducting liquid into such discharge manifold.

10. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, and means for resiliently stopping the movement of the conducting liquid after the liquid has moved in either direction.

11. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, and a closed chamber connected to said U tube at each end thereof to serve as a cushioning chamber resiliently to stop the movement of the said conducting liquid.

12. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, and a receptacle at each end of said U tube connected thereto to receive any of said conducting fluid over-flowing from said tube and a valve adapted on the return movement of said liquid to permit the return of said liquid which has so over-flowed to said U tube.

13. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, and means including a buoyant valve for resiliently stopping the movement of said conducting fluid in either direction and means operated by said buoyant valve for operating the reversing means.

14. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, and means to equalize the current passing between different portions of said electrodes.

15. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, and means to convert the momentum of the liquid moving in the tube into relatively slow speed volumetric displacement in said chamber.

16. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said electrodes having taps at different points in the outer area thereof and means for passing current between them including a plurality of separate circuits each connected to one pair of said taps and means for creating different electrical pressures in said circuits to maintain a predetermined distribution of current across between different portions of the electrodes.

17. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said electrodes having taps at different points in the outer area thereof and means for passing current between them including a plurality of separate circuits each connected to one pair of said taps and means for creating different electrical pressures in said circuits to maintain a predetermined distribution of current across between different portions of the electrodes, said electrodes being of sufficient electric resistance as to permit such different potentials to be impressed upon its different parts without undue cross currents.

18. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said electrodes having taps at different points in the outer area thereof and means for passing current between them including a plurality of separate circuits each connected to one pair of said taps and means for creating different electrical pressures in said circuits to maintain a predetermined distribution of current across between different portions of the electrodes, said electrodes being so constructed as to prevent flow of current between the taps.

19. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said electrodes having taps at different points in the outer area thereof and the means for passing current between them including a plurality of parallel circuits each connected to one pair of said taps, common means for impressing a fixed voltage in each of said circuits and means for placing a portion of one of said circuits in inverse inductive relation to another.

20. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said electrodes being each divided into a plurality of area sections and said means for passing current between them including a plurality of circuits each connected to one pair of said sections and means for applying different pressures to different ones of said area sections to secure a predetermined current distribution across the conduit.

21. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the reversing mechanism including means situated adjacent to the conducting liquid for generating a second electric current in said conducting liquid and means responsive to changes in said second electric current for operating said reversing means.

22. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the reversing means including a coil situated in said magnetic field adjacent to said conduit whereby if said liquid is not present in said conduit opposite said coil, the current in said coil is decreased and means for utilizing said decrease in current to operate the reversing means.

23. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the means for establishing the magnetic field comprising a separate magnetizing coil for each leg of the U shaped conduit, whereby each said coil changes its impedance when liquid is not present in said conduit, and the reversing mechanism is operated by said change in impedance.

24. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the means for passing the electric current comprising a U shaped member, the terminals of which comprise the electrodes, and a magnetized core encircling said member.

25. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the means for passing the electric current comprising a U shaped member, the terminals of which comprise the electrodes, and a magnetized core encircling said member and means are provided for equalizing the distribution of current through different parts of the area of said electrodes.

26. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the magnetic field being established by a magnetizing coil and the means for passing current comprises a transformer having a primary and the magnetizing coil and the primary are arranged in series across the line.

27. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the means for establishing the magnetic field comprising a separate magnetizing coil for each leg of the U shaped conduit, whereby each of said coils changes its impedance when liquid is not present in said conduit and the means for passing current comprises a transformer having a primary arranged in series with the magnetizing coils and the reversing mechanism includes a relay having coils differentially responsive to the impedance of the magnetizing coils and arranged to reverse the polarity of the transformer primary.

28. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the gas outlet being provided with a valve mechanism constructed and arranged to be actuated by the presence of conducting liquid, to close said outlet to shut off the exit of the conducting liquid.

29. A device of the character described comprising in combination a U-shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said cnamber above the conducting liquid in said conduit, said magnetic field and electric circuit comprising a magnetic field and electric circuit in each leg of the conduit, a buoyant valve for operating the reversing mechanism arranged to open one of the electric circuits causing the movement of said conducting liquid when the liquid and said valve come into contact before the completion of the movement of said liquid and to close said circuit again in reverse after the reverse movement of the liquid has begun.

30. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, a buoyant valve for controlling the gas outlet, and said reversing mechanism being arranged to be operated by said buoyant valve to open one of the electric circuits causing said movement of said conducting liquid when said conducting liquid comes into contact with said buoyant valve and to close said circuit after the reverse movement of the liquid has begun.

31. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, a closed chamber at each end of said U tube having an opening in its bottom connected to said U tube and a buoyant valve controlling said opening whereby said liquid may flow into or leave said closed chamber but gas confined within said chamber cannot leave said chamber.

32. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, a closed chamber at each end of said U tube having an opening in its bottom connected to said end of said U tube and said gas outlet valve comprising a buoyant member within said chamber constructed and arranged to close said opening in a lower position and to close said gas outlet in an upper position.

33. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, a closed chamber at each end of said U tube having an opening in its bottom connected to said end of said U tube and said fluid outlet valve comprising a buoyant member within said chamber constructed and arranged to close said opening in a lower position and to close said gas outlet in an upper position, said upper position being so located that said conducting liquid may flow into said chamber after the fluid outlet valve is closed to absorb the energy of said conducting liquid and start the movement thereof in the opposite direction.

34. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit, in each leg of said conduit, communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said compressing chamber comprising a compressor chamber at the top of each end of the U, having its lower end tapered to increase in area upwardly from the end of the U to decelerate the liquid and keep its surface level.

35. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit, in each leg of said conduit, communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said compressing chamber comprising a compressor chamber at the top of each end of the U, having a body portion and having its upper portion tapered upwardly to reduce the area toward an upper outlet to avoid sudden impact against the end of the compressor chamber.

36. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit, in each leg of said conduit, communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said compressing chamber comprising a compressor chamber at the top of each end of the U, having a body portion and having its upper portion tapered upwardly to reduce the area to avoid sudden impact against the end of the compressor chamber, said compressor chamber having an opening at the top of said tapered portion and said reversing mechanism including a member situated in said opening whereby the force of movement of the liquid is directed against said member.

37. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit, in each leg of said conduit, communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, said compressing chamber comprising a compressor chamber at the top of each end of the U, said chambers having a lower portion tapered to increase in area upwardly from the end of the conduit and having an upper portion tapered to decrease in area upwardly toward the top of the chamber, said chamber having an opening in its top.

38. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the means for establishing the magnetic field including a magnetic coil and a core having magnetic poles at each side of said conduit and the means for passing current between the electrodes comprising a plurality of connections distributed over the area of said electrodes, one of said poles being provided with a plurality of slots to permit certain of said connections to pass through said field closely adjacent to said conduit.

39. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the means for establishing the magnetic field including a magnetic coil, and a core having magnetic poles on each side of said conduit, one of said poles being provided with slots transverse to the magnetic flux and transverse to the conduit, dividing the poles into sections and closed coils within said slots, certain of said coils surrounding only those sections having the least impedance and others of said cells surrounding sections having greater impedance, whereby the current is equalized throughout the area of the electrodes.

40. A device of the character described comprising in combination a U shaped conduit adapted to contain a conducting liquid and having a pair of electrodes within it spaced from each other in a direction transverse to the conduit, means for establishing a magnetic field across said conduit transverse to the direction of spacing of the electrodes and an electric circuit insulated from said conducting liquid except at said electrodes for passing an electric current between the electrodes whereby the effect of said current is to propel said liquid along said conduit, a compressing chamber above said conduit communicating therewith, means for reversing the phase relationship between the current between said electrodes and the magnetic field when the liquid has been so moved, whereby the direction of motion is reversed and a valve controlled inlet and outlet for gas to said chamber above the conducting liquid in said conduit, the means for establishing the magnetic field including a magnetic coil and a core having magnetic poles on each side of said conduit, one of said poles being provided with slots transverse to the magnetic flux and transverse to the conduit, coils in said slots and means for imposing a potential in said coils to equalize the distribution of current over the area of the electrodes.

FRANCIS LAGO.